(12) United States Patent
Moule

(10) Patent No.: US 7,445,292 B2
(45) Date of Patent: Nov. 4, 2008

(54) SEAT PORTION OF A SEAT

(76) Inventor: Terry Glyn Moule, 11 Porsythia Close, South Wold, Bicester, Oxon OX26 3GA (GB)

( * ) Notice: Subject to any disclaimer, the term of this patent is extended or adjusted under 35 U.S.C. 154(b) by 20 days.

(21) Appl. No.: 10/563,546

(22) PCT Filed: Jun. 28, 2004

(86) PCT No.: PCT/GB2004/002777

§ 371 (c)(1),
(2), (4) Date: Jan. 4, 2006

(87) PCT Pub. No.: WO2005/002915

PCT Pub. Date: Jan. 13, 2005

(65) Prior Publication Data

US 2006/0170274 A1    Aug. 3, 2006

(30) Foreign Application Priority Data

Jun. 30, 2003    (GB)  ................................ 0315300.4
Jun. 30, 2003    (GB)  ................................ 0315301.2

(51) Int. Cl.
*A47C 7/18*  (2006.01)
(52) U.S. Cl. ........................... 297/452.25; 297/452.26; 297/452.27; 297/452.32
(58) Field of Classification Search ............ 297/452.21, 297/452.25, 452.26, 452.27, 452.29, 452.3, 297/452.32, 452.37
See application file for complete search history.

(56) References Cited

U.S. PATENT DOCUMENTS

| | | | |
|---|---|---|---|
| 3,612,607 A | | 10/1971 | Lohr |
| 4,132,228 A | * | 1/1979 | Green ................ 297/452.26 X |
| 4,522,447 A | * | 6/1985 | Snyder et al. .......... 297/452.27 |
| 4,572,578 A | * | 2/1986 | Perkins .................. 297/452.32 |
| 4,643,481 A | * | 2/1987 | Saloff et al. ............ 297/452.25 |
| 4,682,818 A | * | 7/1987 | Morell .................... 297/452.27 |
| 4,726,086 A | | 2/1988 | McEvoy |
| 4,753,480 A | * | 6/1988 | Morell .................... 297/452.27 |
| 4,755,411 A | * | 7/1988 | Wing et al. ......... 297/452.27 X |
| 4,813,738 A | * | 3/1989 | Ito ........................ 297/180.12 |
| 4,834,455 A | * | 5/1989 | Proctor ............... 297/452.32 X |
| 4,835,801 A | * | 6/1989 | Walpin et al. .......... 297/452.32 |
| 4,865,379 A | * | 9/1989 | Aoki et al. ............. 297/180.12 |
| 5,018,790 A | * | 5/1991 | Jay ........................ 297/452.26 |
| 5,085,487 A | * | 2/1992 | Weingartner et al. .................. 297/452.27 X |
| 5,294,181 A | * | 3/1994 | Rose et al. ............. 297/452.25 |
| 5,352,023 A | * | 10/1994 | Jay et al. ............. 297/452.26 X |
| 5,378,045 A | * | 1/1995 | Siekman et al. ........ 297/452.25 |
| 5,390,384 A | * | 2/1995 | Dinsmoor et al. ... 297/452.27 X |
| 5,439,270 A | | 8/1995 | Owen |
| 5,513,899 A | * | 5/1996 | Michaels et al. ..... 297/452.25 X |
| 5,522,106 A | * | 6/1996 | Harrison et al. ..... 297/452.25 X |
| 6,082,824 A | * | 7/2000 | Chow .................. 297/452.27 X |
| 6,098,000 A | | 8/2000 | Long et al. |
| 6,142,573 A | * | 11/2000 | Harding et al. ........ 297/452.25 |
| 6,226,819 B1 | * | 5/2001 | Ogawa et al. ....... 297/452.27 X |

(Continued)

*Primary Examiner*—Rodney B. White
(74) *Attorney, Agent, or Firm*—Iandiorio Teska & Coleman

(57) ABSTRACT

A seat portion (4) for a seat (2), which seat portion (4) comprises at least a first part (8) which is made of a first plastics foam material of a first density, and a second part (10) which is made of a second plastics foam material of a second and different density.

19 Claims, 11 Drawing Sheets

U.S. PATENT DOCUMENTS

Figure 1:
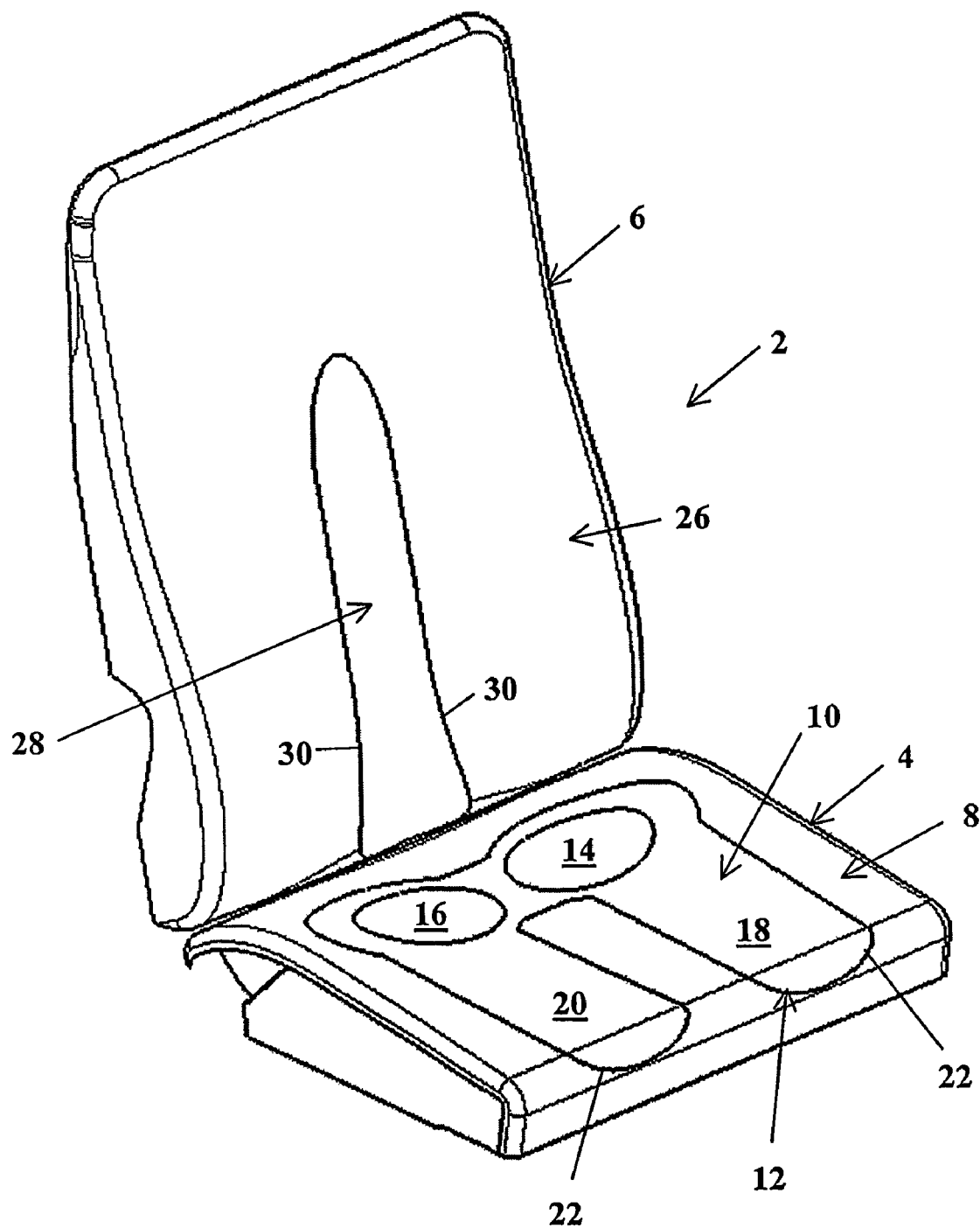

| | | |
|---|---|---|
| 6,241,320 B1 * | 6/2001 | Chew et al. ............ 297/452.26 |
| 6,247,751 B1 * | 6/2001 | Faust et al. ............ 297/180.13 |
| 6,256,819 B1 * | 7/2001 | Maier et al. ......... 297/452.26 X |
| 6,447,058 B1 | 9/2002 | Jackson |
| 6,481,801 B1 * | 11/2002 | Schmale ................ 297/452.27 |
| 6,625,830 B2 * | 9/2003 | Lampel .............. 297/452.26 X |
| 6,733,072 B2 * | 5/2004 | Jaillet et al. ............ 297/180.13 |
| 7,140,057 B2 * | 11/2006 | Hetzel et al. ........ 297/452.26 X |
| 7,216,388 B2 * | 5/2007 | Bieganek et al. .... 297/452.26 X |
| 2002/0067064 A1 * | 6/2002 | Jaillet et al. ............ 297/452.27 |

* cited by examiner

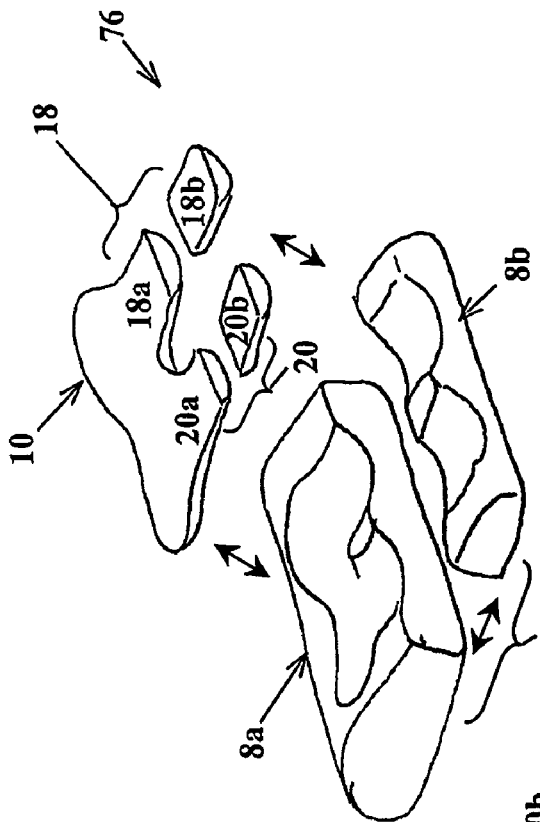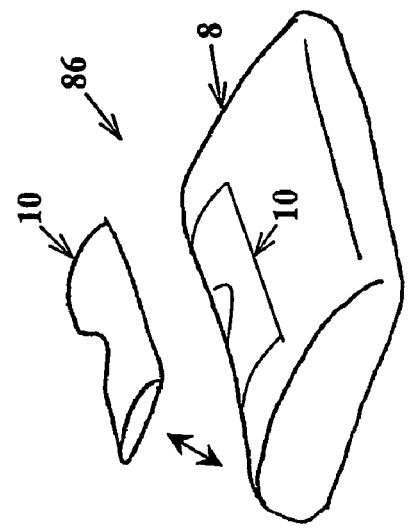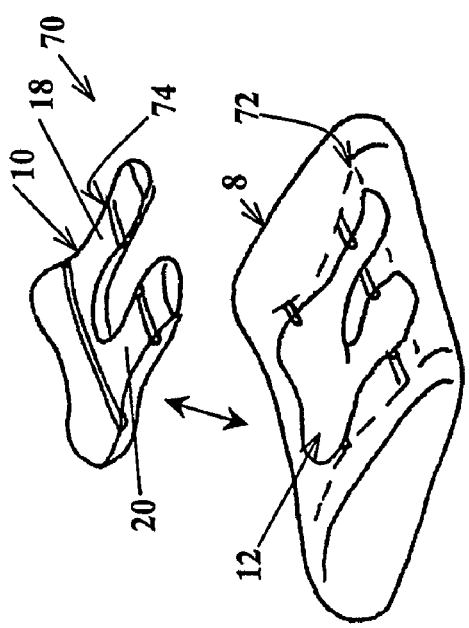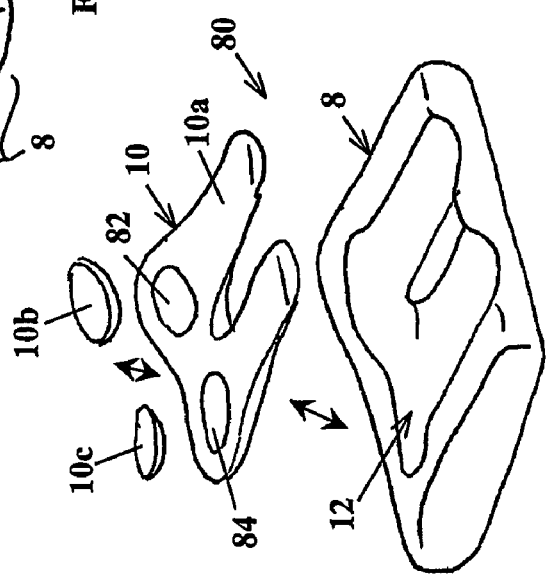

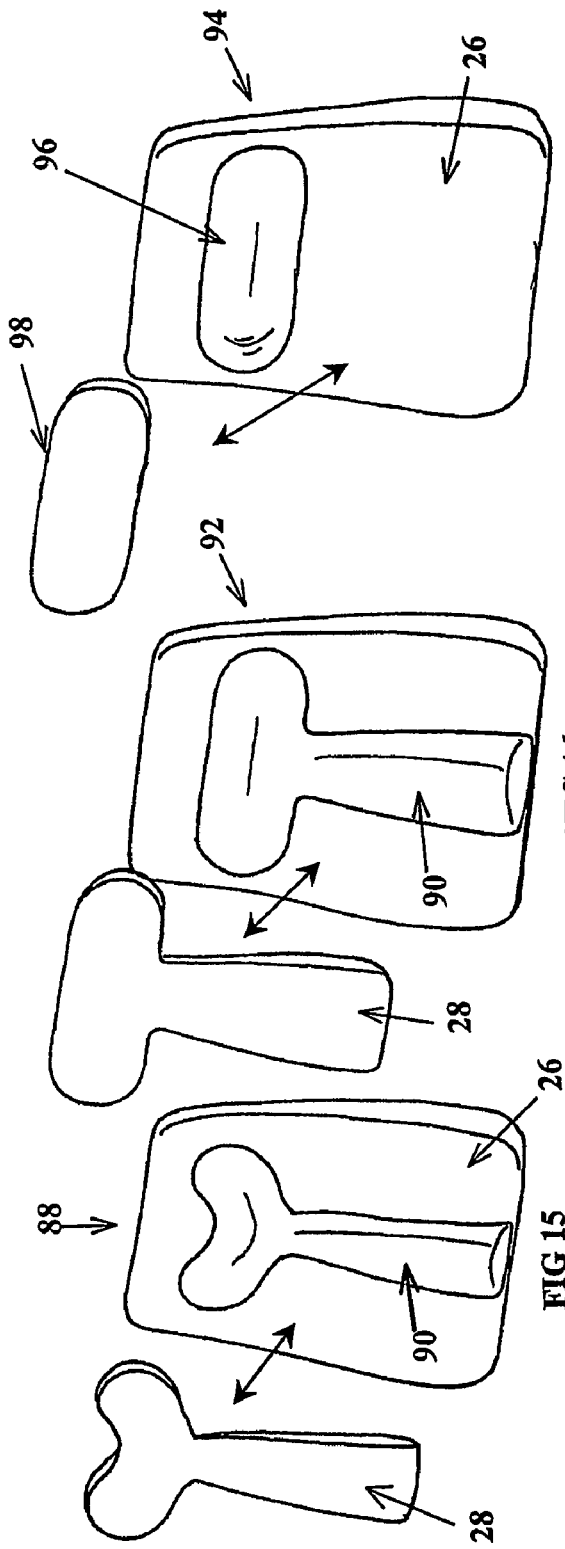

SEAT PORTION OF A SEAT

This invention relates to a seat portion of a seat, and also to a seat when provided with the seat portion.

There are may different types of seats comprising a seat portion and a backrest portion. The seats are often such that the seat portion is not comfortable to sit on, and does not give adequate support to the posterior of a person sitting on the seat portion. The seat portion may, for example, restrict the positioning of the person's pelvic girdle, and it may apply undue pressure to the person's ischial tuberosities. In addition, in the region of the person's posterior, the seat portion may cause restriction of local blood flow and/or pinching of local nerves.

It is an aim of the present invention to reduce the above mentioned problem.

Accordingly, the present invention provides a seat portion for a seat, which seat portion comprises at least a first part which is made of a first plastics foam material of a first hardness, and a second part which is made of a second plastics foam material of a second and lesser hardness: and in which the second part is in the form of an insert which fits into a complementarily shaped recess in the first part and does not extend into a backrest portion for the seat; the insert substantially fills the recess; and the insert comprises a pair of pads which are positioned so as to be underneath the cheeks of the posterior of a person sitting on the seat portion, and a pair of legs which are positioned so as to be underneath the thighs of the person sitting on the insert; the insert is a one piece insert or of a continuous shape; the recess extends into the first part from an upper surface of the first part; and the insert has an upper surface which is flush with the upper surface of the first part.

The seat portion of the present invention is able to give a good degree of comfort to a person sitting on the seat portion, irrespective of the seat portion being used at different times by different persons of different heights and weights.

If desired, the pads and the legs may have curved faces which engage complementarily curved faces in the recess. Alternatively, if desired, the pads and the legs may have rectilinear faces which engage rectilinear faces in the recess.

The seat portion may be one in which the second part does not have any voids of the type used to increase flexibility and/or save plastics foam material.

As an alternative to the second part being in the form of an insert, the second part may be in the form of a surface-mounted addition which rests on an upper surface of the first part.

In all embodiments of the invention, the second part may be fixed to the first part. The fixing may be effected by an adhesive, stitching or any other suitable and appropriate fixing means. Alternatively, the second part may be movable with respect to the first part.

The seat portion may be formed only of the first and second parts. Alternatively more parts may be employed so that, for example, the seat portion may comprise the first and second parts and also one, two or three more parts.

The seat portion may include a heating element.

As indicated above, the present invention also extends to a seat when including the seat portion of the invention.

The seat may include a backrest portion.

The backrest portion may comprise a main part which is made of a plastics foam material of a first hardness, and a support part which is made of a plastics foam material of a second and lesser hardness. With such a backrest portion, the seat may be such that a person sitting on the seat portion and resting their back on the backrest portion is able to obtain optimum lumbar support for the back of the person, irrespective of the height and weight of the person. Usually the backrest portion will comprise only one support part. If desired however the backrest portion may comprise more than one support part.

The support part may be fixed to the main part. The fixing may be effected by an adhesive, stitching or any other suitable and appropriate fixing means. Alternatively, the support part may be movable with respect to the main part. With a support part which is movable with respect to the main part, a person sitting on the seat and resting their back on the support part is able to cause the support part to adjust its position with respect to the main part in order to obtain optimum lumbar support.

The main part of the backrest portion may be such that it increases in thickness in a direction towards the seat portion.

The support part of the backrest portion may be a rectilinear support part. Other shapes for the support part may be employed. The rectilinear support part may be conical in shape, with longest sides extending towards the seat portion.

The seat may include a peripheral frame which extends around the periphery of the backrest portion.

The seat may include a headrest portion.

The seat may be any suitable and appropriate seat. Thus, for example, the seat may be a vehicle seat for a motor vehicle, an aircraft seat for an aircraft, a boat seat for a boat, a military seat for a military vehicle, a train seat for a train, a hovercraft seat for a hovercraft, a domestic seat for domestic use, an office seat for office use, or an industrial seat for use in industrial premises.

Where the seat is a vehicle seat for a motor vehicle, then the vehicle may be any suitable and appropriate vehicle including a car, van, bus, coach or lorry. Where the seat is a seat for a boat or a hovercraft, then the seat may be especially advantageous for ferries where passengers are generally required to sit together in their seats for the duration of their journey. Where the seat is a domestic seat, then the domestic seat may be a chair, armchair or settee.

The seat may be such that the seat portion and/or the backrest portion are made of a wide variety of different plastics foam materials. Various suitable numbers of different pieces of plastics foam material may be employed.

In one embodiment of the invention the seat portion may be such that an under surface of the second part has protuberances, and an upper surface of the first part may have recesses complementary in shape to the protuberances.

Figure 2:
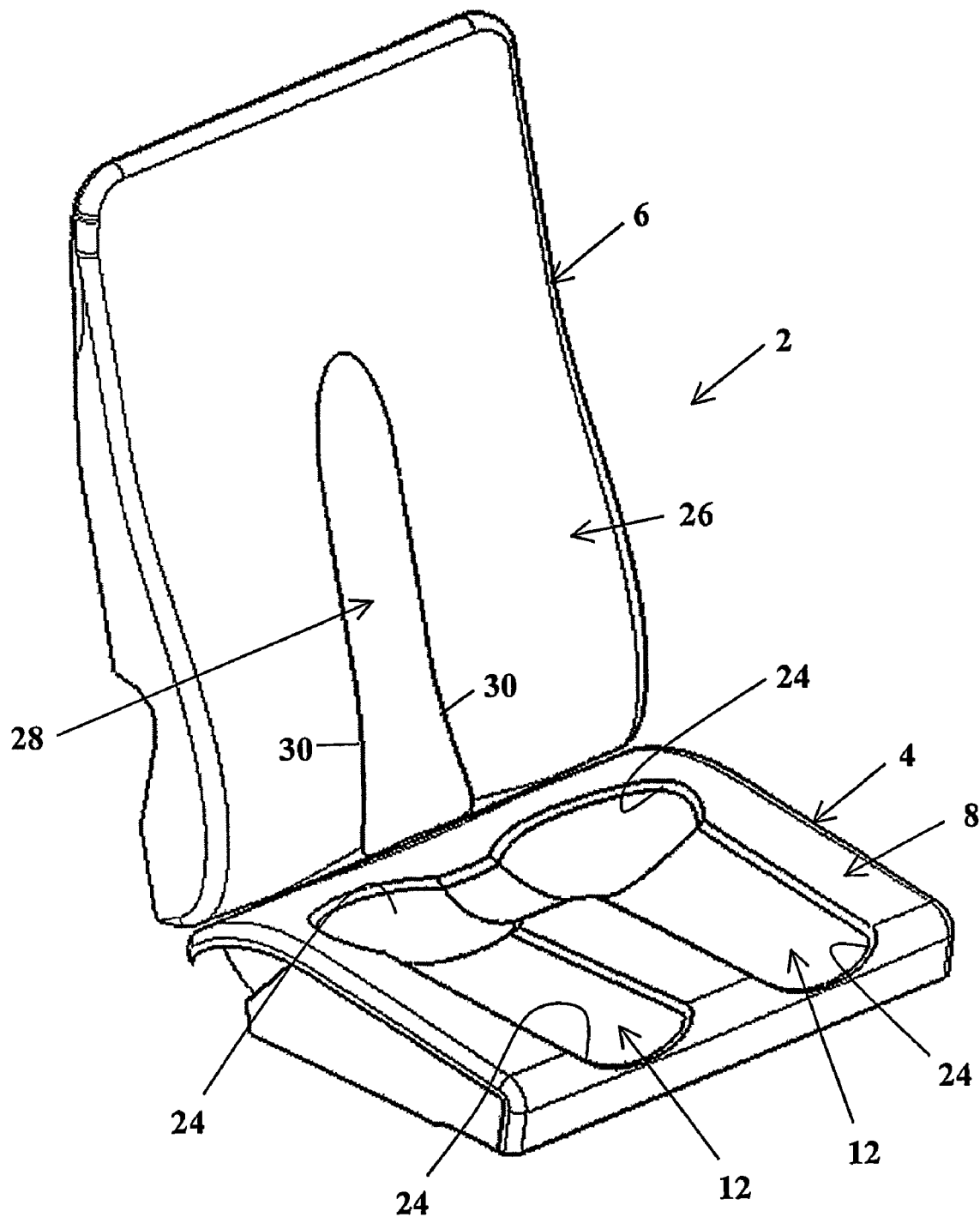
Figure 3:
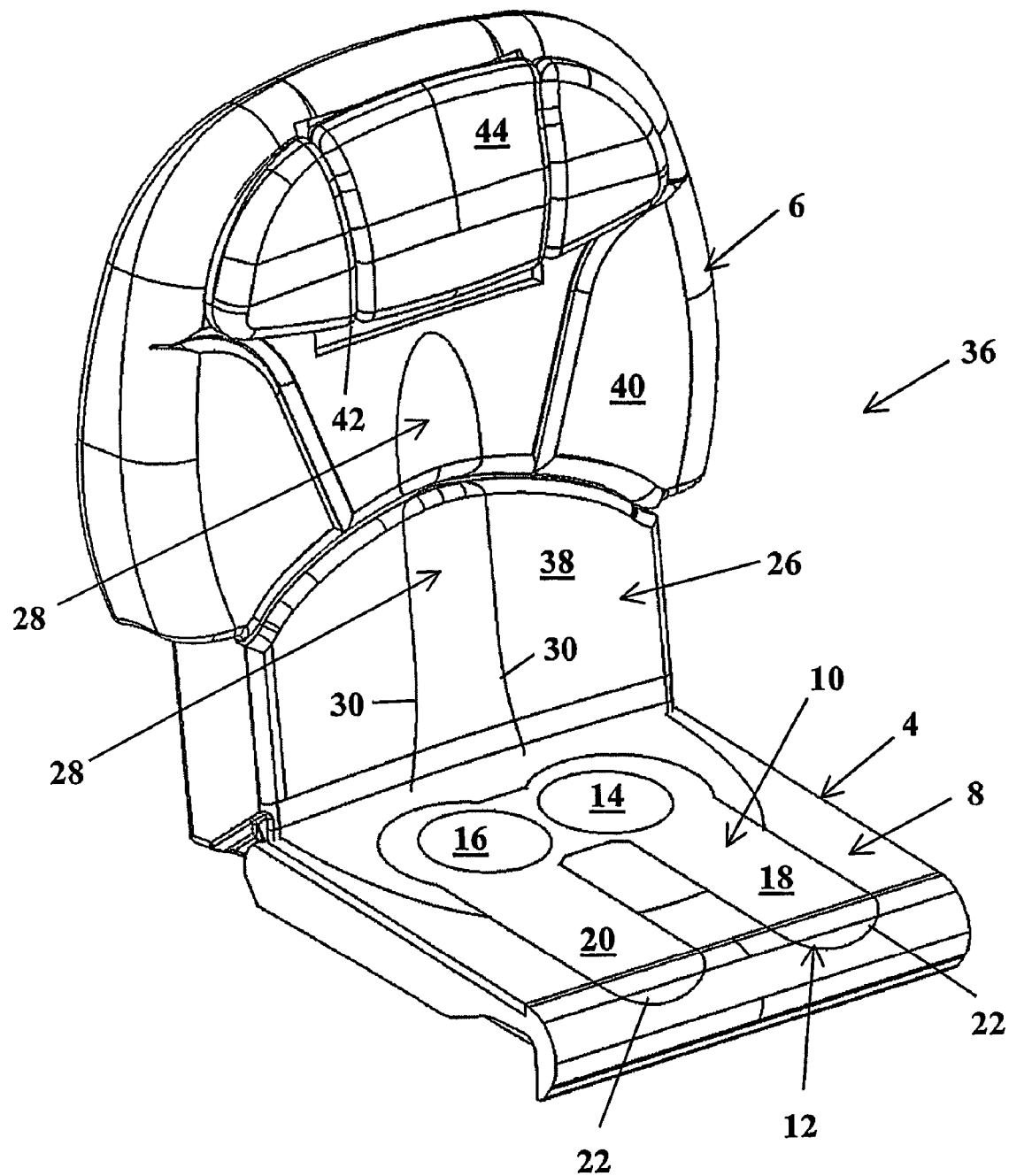
Figure 4:
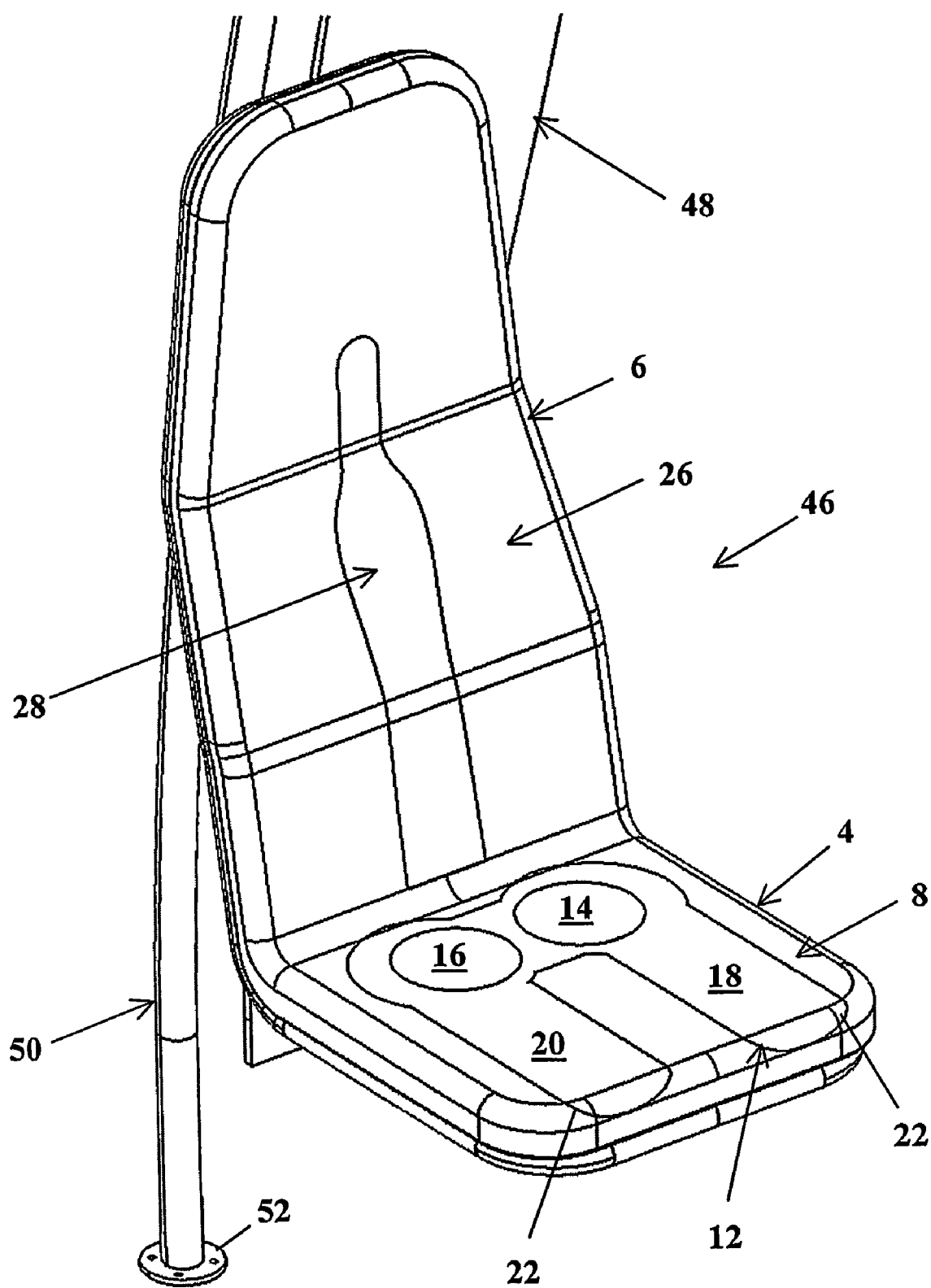
Figure 5:
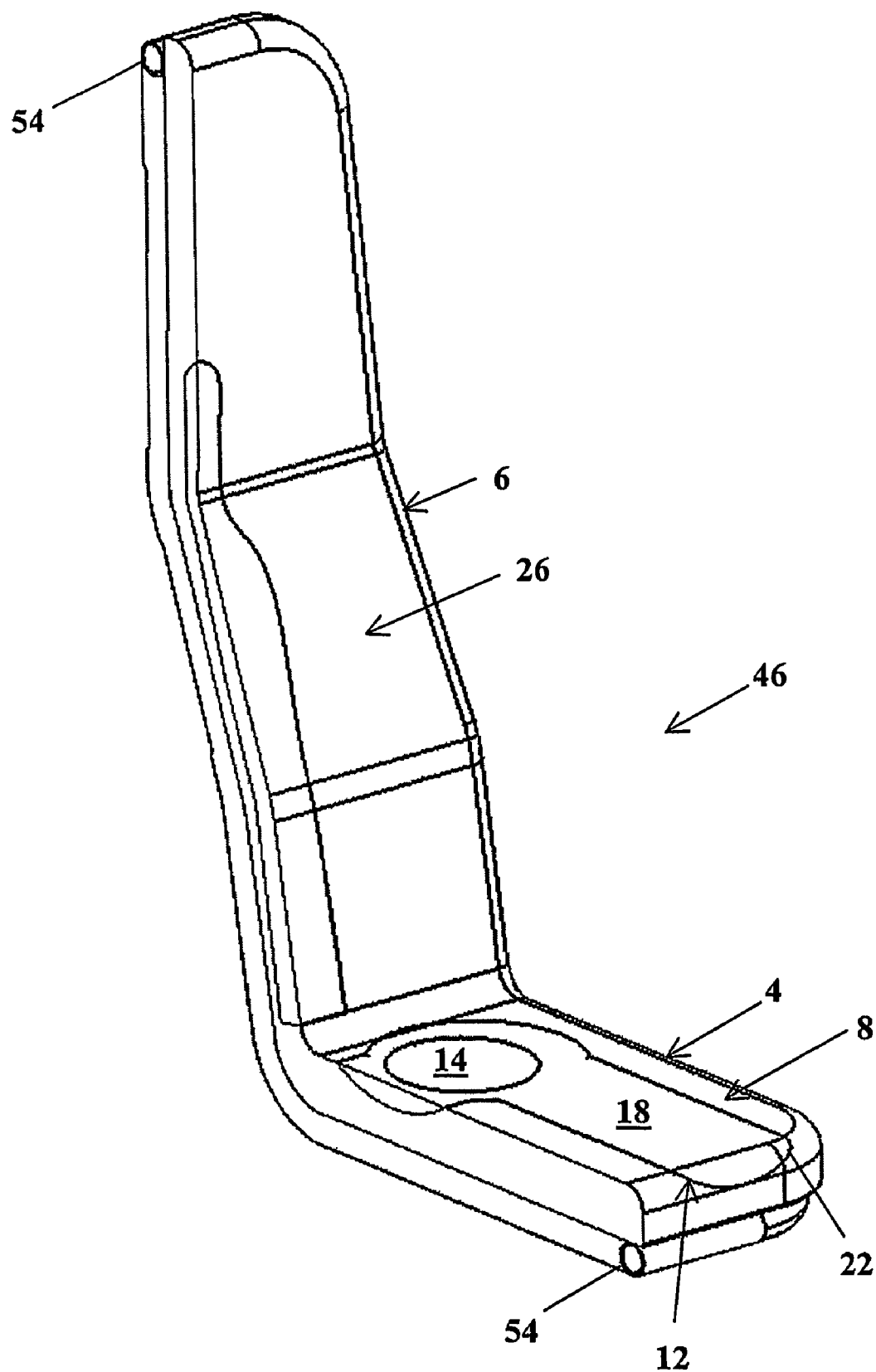
Figure 6:
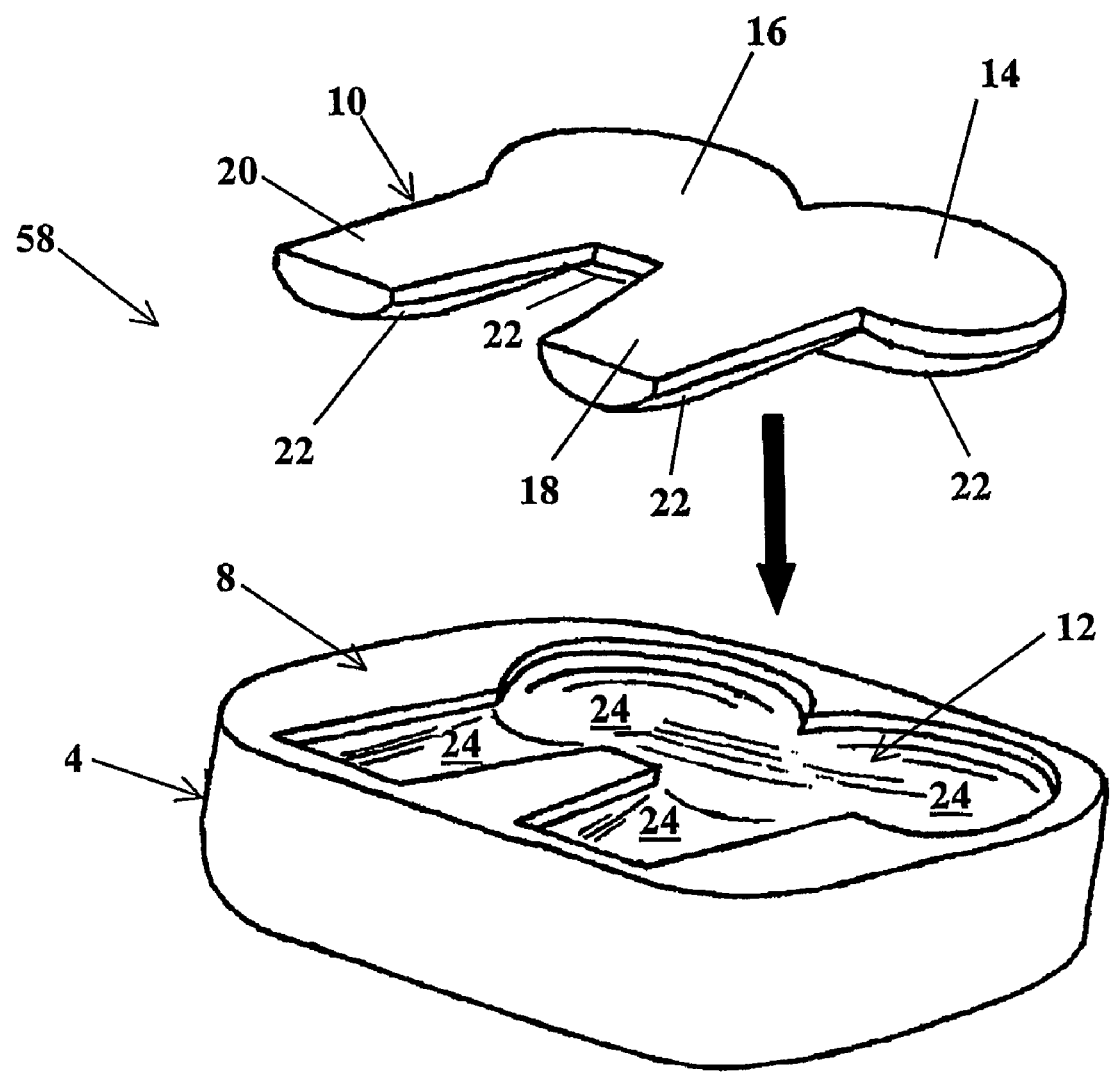
Figure 7:
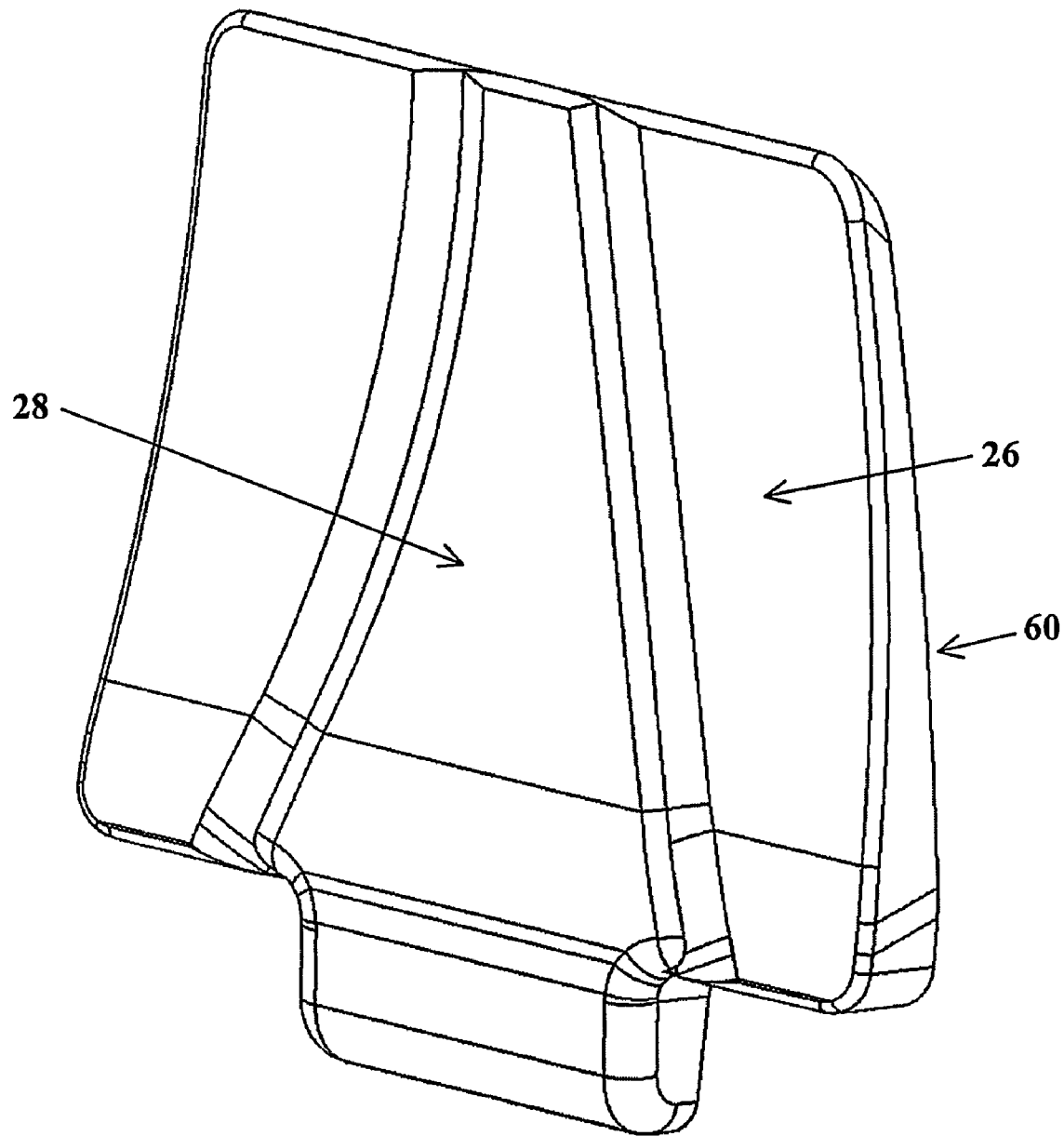
Figure 8:
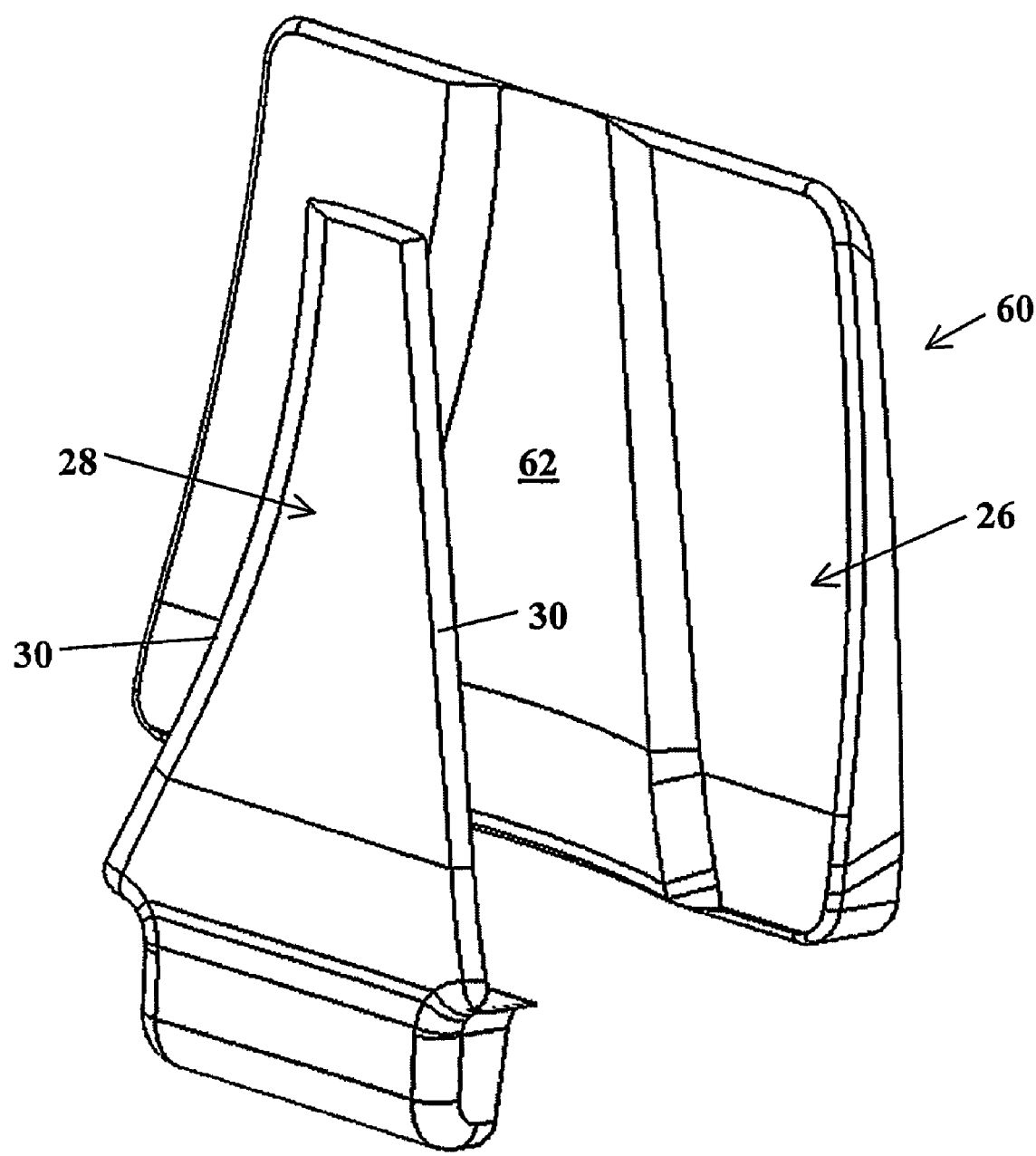
Figure 9:
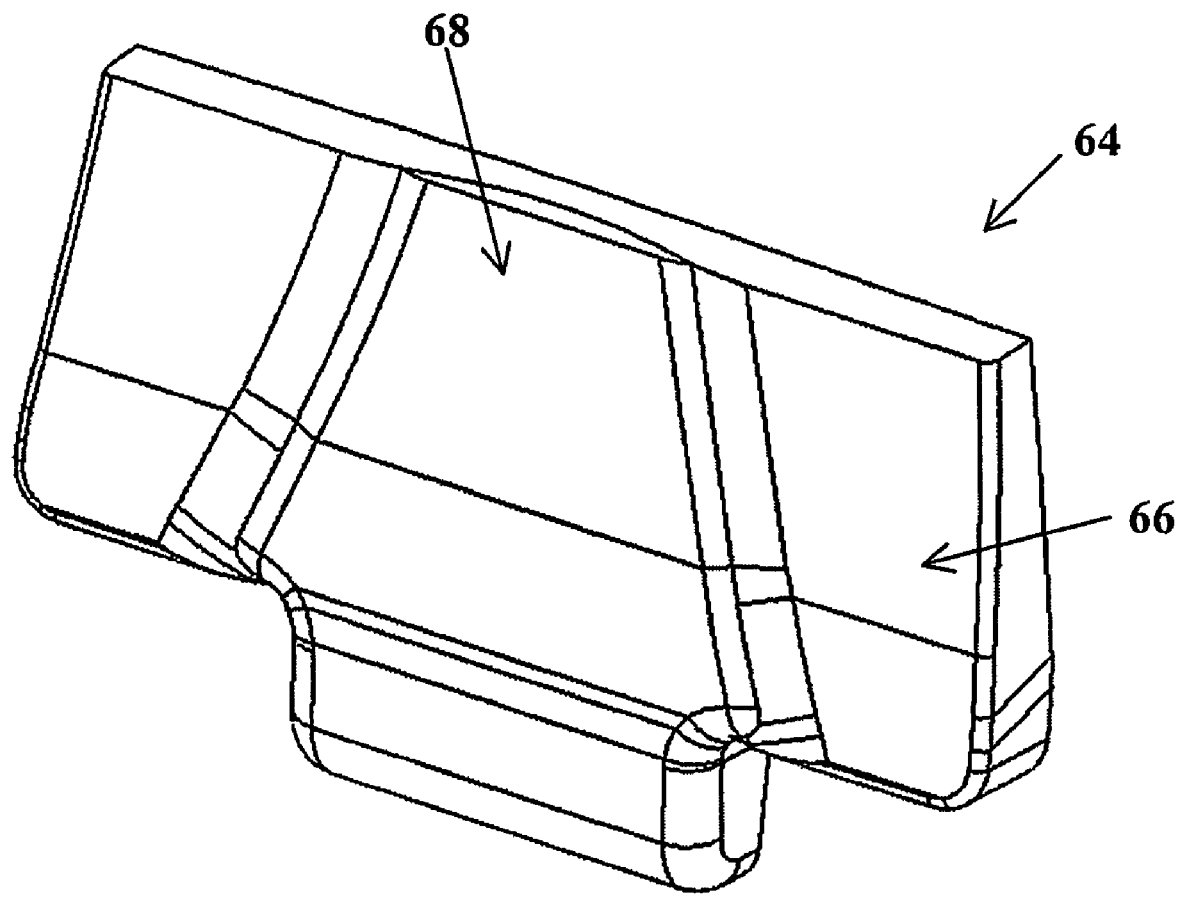

Embodiments of the invention will now be described solely by way of example and with reference to the accompanying drawings in which:

FIG. 1 shows a first seat of the present invention;
FIG. 2 shows part of the seat shown in FIG. 1;
FIG. 3 shows a second seat of the invention;
FIG. 4 shows a third seat of the invention;
FIG. 5 is a section through the seat shown in FIG. 4;
FIG. 6 shows a seat portion of a seat;
FIG. 7 shows a backrest portion of a seat;
FIG. 8 is an exploded view of the backrest portion shown in FIG. 7;
FIG. 9 shows a headrest for a seat;
FIGS. 10-13 show different seat portions of the invention;
FIG. 14 shows a seat portion not of the invention; and
FIGS. 15-20 show different backrest portions that may be used in seats of the present invention.

Referring to FIGS. 1 and 2, there is shown a seat 2 comprising a seat portion 4 and a backrest portion 6. The seat portion 4 comprises a first part 8 which is made of a first plastics foam material of a first density. The seat portion 4 also comprises a second part 10 which is made of a second plastics foam material of a second and different density.

The second part 10 is in the form of an insert which fits into a complementarily shaped recess 12 in the first part 8. The second part 10 in the form of the insert comprises a pair of pads 14, 16 which are so positioned as to be underneath the cheeks of the posterior of a person (not shown) sifting on the seat portion 4. The second part 10 in the form of the insert also comprises a pair of legs 18, 20 which are positioned so as to be underneath the thighs of the person sitting on the insert. As can be appreciated from FIGS. 1 and 2, the pads 14, 16 and the legs 18, 20 have curved faces 22. These curved faces 22 engage complementarily curved faces 24 in the recess 12.

The seat portion 4 is such that the second density is a lesser density than the first density, whereby the second part 10 is softer than the first part 8. The second part 10 does not have any voids of the type used to increase flexibility and/or save plastics foam material.

The second part 10 is fixed in the first part 8 by fixing means in the form of an adhesive (not shown).

The backrest portion 6 comprises a main part 26 which is made of a plastics foam material of a first density, and a support part 28 which is made of a plastics foam material of a second and different density. A person sitting on the seat 2 and resting their back on the support portion 28 is able to obtain optimum lumbar support for the back of the person irrespective of the height and weight of the person. The support part 28 is fixed to the main part 26 by fixing means in the form of an adhesive (not shown).

As can be seen from FIGS. 1 and 2, the main part 26 is such that it increases in thickness in a direction towards the seat portion 4. The support part 28 is a rectilinear support part 28. The rectilinear support part 28 is conical shape with longest sides 30 extending towards the seat portion 4.

In the backrest portion 6, the plastics foam material of the first density of the main part is harder than the plastics foam material of the second density of the support part.

The seat 2 includes a peripheral frame (not shown) which extends around the periphery of the backrest portion 6.

Referring now to FIG. 3, there is shown a seat 36. Similar parts as in FIGS. 1 and 2 have been given the same reference numerals for ease of comparison and understanding. From a comparison of the seats 2 and 36, it will be seen that the seat portions 4 in the seats 2 and 36 are very similar. The spaced-apart legs 18, 20 in both seat portions 4 help to keep the person's legs slightly apart for maximum comfort during sitting.

In FIG. 3, the seat 36 is such that the backrest portion 6 comprises a lower part 38 and an upper part 40. The upper part 40 is larger than the lower part 38 as shown. Both the lower part 38 and the upper part 40 contain portions of the support part 28 as shown.

The upper part 40 has a horizontal slot 42 for enabling a headrest portion 44 to be mounted on the backrest portion 6.

The seats 2, 36 are suitable for forming aircraft seats.

Referring now to FIGS. 4 and 5, there is shown a seat 46 which is suitable for forming a train seat. In the seat 46, similar parts as in the seats 2 and 36 have been given the same reference numerals for ease of comparison and understanding. In the seat 46, it will be seen that there is no separate headrest portion. It will also be seen that the support part 28 is basically parallel-sided rather than being conical as shown in FIGS. 1, 2 and 3. The seat 46 is mounted on a panel support 48 which is itself fixed with respect to an upright pole 50. The pole 50 has a footplate 52 for enabling the pole 50 to be secured to a floor in a train. FIG. 5 illustrates how the seat 46 has a peripheral tubular frame 54.

FIG. 6 shows in exploded form a seat portion 58. For ease of comparison and understanding, similar parts as in the seat portion 4 have been given the same reference numerals. In the seat portion 58, the second part 10 will usually be stuck to the first part 8. Other fixing means such for example as sewing may be employed. Alternatively, the second part 10 may move with a sliding action with respect to the first part 8.

In the aircraft seats 2 and 36 of FIGS. 1 to 3, the under surface insert 10 is secured, e.g. by adhesive, to the recessed upper surface of the support part 8, in the manner illustrated in FIG. 6 which shows a preferred construction for the seat portion of the seats of FIG. 1 to 3. It can be seen from FIG. 6 that the upper surface of the insert 10 is substantially planar and, when attached to the part 8, is co-planar with the non-recessed areas of the upper surface of the part 8.

When the seat 2 or 36 is occupied, the compressive force applied to the insert 10 is transmitted to and distributed to the support part 8 which in turn transmits the force to the seat frame (not shown) which typically comprises an aluminium alloy panel supporting the under surface of the part 8. Thus, the insert 10 is supported by the part 8 which acts to prevent excessive compressive deformation of the insert 10. As a consequence, the seat does not have hard points and does not suffer from "bottoming out" and is thus comfortable for occupants throughout a wide range of body weights.

The deformability of the foam materials has been expressed in terms of their densities. In the case of seats for aircraft, the parameter used to define deformability is hardness, expressed in Newtons, i.e. the force to compress the foam material by a unit distance. For the aircraft seats of the FIGS. 1 to 3, the insert 10 will always have a hardness lower than that of the support part 8. Preferred hardness ranges are 50-175 Newtons for the insert 10, 200-400 Newtons for the support part 8, 125-175 Newtons for the main part 26, and 50-125 Newtons for the support part 28.

FIGS. 7 and 8 show a backrest portion 60. Similar parts as in the backrest portion 6 have been given the same reference numerals for ease of comparison and understanding. In the backrest portion 60, it will be seen that the main part 26 and the support part 28 are differently shaped to the main part 26 and the support part 28 in the backrest portion 6. FIG. 8 shows how the backrest portion 60 with its outwardly sloping longest sides 30 fits into a complementarily shaped recess 62 in the main part 26 of the backrest portion 60. The support part 28 may be fixed in position in the recess 62 by fixing means such for example as an adhesive or stitching. Alternatively, the support part 28 may be movable in the recess 62 with respect to the main part 26.

FIG. 9 shows a headrest portion 64 which may fit to the backrest portion of a seat. The headrest portion 64 is shaped as shown and it has a main part 66 and a head support part 68. The head support part 68 is of a different density to the main part 66. The head support part 68 will usually be softer than the main part 66 but it may be harder if desired. The head support part 68 may move with respect to the main part 66. The movement will normally be a sliding movement with the head support part 68 sliding in a complementarily shaped recess in the main part 66.

FIGS. 10-14 show different types of seat portions. Similar parts as in the seat portion 4 have been given the same reference numerals for ease of comparison and understanding.

FIG. 10 shows the seat portion 70 having a first part 8 and a second part 10. The first part 8 has a shaped recess 12 which is generally similar to the shaped recess 12 shown in the seat portion 4. The second part 10 is generally similar to the second part 10 shown in the seat portion 4. In FIG. 10, it will be noted that the first part 8 has style lines 72, whilst the second part 10 has style lines 74.

In FIG. 11, there is shown a seat portion 76 in which the legs 18, 20 are each in two parts 18a, 18b, and 20a and 20b. Similarly, the seat portion 8 is in two parts 8a, 8b.

FIG. 12 shows a seat portion 78 in which the first part 8 and the second part 10 are similar to the first part 8 and the second part 10 shown in FIG. 10, but without the style lines 74.

FIG. 13 shows a seat portion 80 which is similar to the seat portion 78, except that the first part 10 is formed in three pieces with a main piece 10*a*, and two insert pieces 10*b*, 10*c* which insert into correspondingly shaped recesses 82, 84.

FIG. 14 shows a seat portion 86 having a first part 8 and a second part 10. The first part 8 is too thin to be provided with a shaped recess such as a recess 12. In view of this, the second part 10 is in the form of a surface-mounted addition which is stuck or otherwise secured by suitable fixing means in position on top of the first part 8, as shown by broken lines on the first part 8.

FIG. 15 shows a backrest portion 88 having a main part 26 and a support part 28. The support part 28 is shaped as shown and it fits into a complementarily shaped recess 90. The main part 26 and the support part 28 are made of plastics foam material of different densities. The plastics foam material of the main part 26 is of a first and harder density than the plastics foam material of the second part.

FIG. 16 shows a backrest portion 92 which is like the backrest portion 88 except that the support part 28 is slightly differently shaped, as is the complementarily shaped recess 90.

FIG. 17 shows a backrest portion 94 which does not have a back support part 28. However the main part 26 has a recess 96 for receiving a headrest portion 98. The headrest portion 98 may be fixed or movable in the recess 96.

FIG. 18 show a backrest portion 100 in which the main part 26 is in two parts 26*a*, 26*b*. Also, the support part 28 is in two parts 28*a*, 28*b*. All the parts split about a split line 102.

FIG. 19 shows a backrest portion 104 is which the support part 28 is triangularly shaped in cross section. The support part 29 fits into a corresponding triangularly shaped recess 106 in the main part 26.

FIG. 20 shows a backrest portion 108 which is like the backrest portion 104 except that the main part 26 and the support part 28 are provided with style lines 110, 112.

It is to be appreciated that the embodiments of the invention described above with reference to the accompanying drawings have been given by way of example only and that modifications may be effected. Thus, for example, a wide variety of different types of plastics foam materials may be employed in the seat portions 4 and the backrest portions 6. Also, all of the seats of the present invention may be covered with an appropriate fabric covering. The seats may be of different designs to those shown. The seat portions shown in the drawings may each include a heating element if desired, for example if the seats are to be for installation in road vehicles.

The invention claimed is:

1. A seat portion for a seat, which seat portion comprises at least a first part which is made of a first plastics foam material of a first hardness, and a second part which is made of a second plastics foam material of a second and lesser hardness: and in which the second part is in the form of an insert which fits into a complementarily shaped recess in the first part and does not extend into a backrest portion for the seat; the recess extends from an upper surface of the first part towards an opposite surface; the recess does not extend through said opposite surface; the recess having upwardly facing inclined edges; the insert substantially fills the recess; the insert comprises a pair of pads which are positioned so as to be underneath the cheeks of the posterior of a person sitting on the seat portion, and a pair of legs which are positioned so as to be underneath the thighs of the person sitting on the insert; the insert is a one piece insert; the pads and legs having complementary downwardly facing inclined edges that engage with the upwardly facing inclined edges of the recess; and the insert has an upper surface which is flush with the upper surface of the first part.

2. A seat portion according to claim 1 in which the pads and the legs have curved faces which engage complementarily curved faces in the recess.

3. A seat portion according to claim 1 in which the second part does not have any voids of the type used to increase flexibility and/or save plastics foam material.

4. A seat portion according to claim 1 in which the second part is in the form of a surface-mounted addition which rests on an upper surface of the first part.

5. A seat portion according to claim 1 in which the second part is fixed to the first part.

6. A seat portion according to claim 1 in which the second part is movable with respect to the first part.

7. A seat portion according to claim 1 and including a heating element.

8. A seat including a seat portion according to claim 1.

9. A seat according to claim 8 and including a backrest portion.

10. A seat according to claim 9 in which the backrest portion comprises a main part which is made of a plastics foam material of a first hardness, and a second part which is made of a plastics foam material of a second and lesser hardness.

11. A seat according to claim 10 in which the support part is fixed to the main part.

12. A seat according to claim 10 in which the support part is movable with respect to the main part.

13. A seat according to claim 10 in which the main part is such that it increases in thickness in a direction towards the seat portion.

14. A seat according to claim 10 in which the support part is a rectilinear support part.

15. A seat according to claim 14 in which the rectilinear support part is conical in shape with longest sides extending towards the seat portion.

16. A seat according to claim 9 and including a peripheral frame which extends around the periphery of the backrest portion.

17. A seat according to claim 9 and including a headrest portion.

18. A seat portion according to claim 1 in which an undersurface of the second part has protuberances, and an upper surface of the first part has recesses complementary in shape to the protuberances.

19. A seat portion for a seat, which seat portion comprises at least a first part which is made of a first plastics foam material of a first hardness, and a second part which is made of a second plastics foam material of a second and lesser hardness: and in which the second part is in the form of an insert which fits into a complementarily shaped recess in the first part and does not extend into a backrest portion for the seat; the insert substantially fills the recess; the insert comprises a pair of pads which are positioned so as to be underneath the cheeks of the posterior of a person sitting on the seat portion, and a pair of legs which are positioned so as to be underneath the thighs of the person sitting on the insert; the insert is of a continuous shape; the recess extends into the first part from an upper surface of the first part and the insert has an upper surface which is flush with file upper surface of the first part.

* * * * *